(12) United States Patent
Thapliyal

(10) Patent No.: US 11,009,962 B2
(45) Date of Patent: May 18, 2021

(54) SWITCHING DATA ITEM ARRANGEMENT BASED ON CHANGE IN COMPUTING DEVICE CONTEXT

(71) Applicant: SAMSUNG ELECTRONICS CO., LTD., Suwon-si (KR)

(72) Inventor: Rohit Thapliyal, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 43 days.

(21) Appl. No.: 16/121,175

(22) Filed: Sep. 4, 2018

(65) Prior Publication Data

US 2019/0073042 A1 Mar. 7, 2019

(30) Foreign Application Priority Data

Sep. 5, 2017 (IN) .............................. 201711031414

(51) Int. Cl.
  *G06F 3/01* (2006.01)
  *G06F 9/445* (2018.01)
  *G06F 9/451* (2018.01)

(52) U.S. Cl.
  CPC .......... *G06F 3/017* (2013.01); *G06F 9/44505* (2013.01); *G06F 9/451* (2018.02)

(58) Field of Classification Search
  CPC ...... G06F 9/451; G06F 9/44505; G06F 3/017; G06F 1/163; G06F 3/04883; G04G 21/02; G04G 9/0064; G04G 21/04
  See application file for complete search history.

(56) References Cited

U.S. PATENT DOCUMENTS

| 8,289,162 B2 | 10/2012 | Mooring et al. |
| 8,370,103 B2 | 2/2013 | Cho et al. |
| 9,189,062 B2 | 11/2015 | Janefalker et al. |
| 9,411,048 B2 | 8/2016 | Vieta |
| 9,582,851 B2 | 2/2017 | Raman |
| 2009/0222767 A1* | 9/2009 | Matthews ............. G06F 3/0482 715/835 |
| 2009/0249247 A1* | 10/2009 | Tseng ................ H04M 1/72552 715/808 |

(Continued)

FOREIGN PATENT DOCUMENTS

| KR | 10-2016-0142128 A | 12/2016 |
| KR | 10-2017-0058760 A | 5/2017 |

(Continued)

OTHER PUBLICATIONS

Search Report dated Dec. 7, 2018, issued by the International Searching Authority in counterpart International Patent Application No. PCT/KR2018/010157 (PCT/ISA/210).

(Continued)

*Primary Examiner* — Daniel W Parcher
(74) *Attorney, Agent, or Firm* — Sughrue Mion, PLLC

(57) ABSTRACT

A method and computing system are provided. The method includes detecting a change in a context of a computing device. In response to detecting the change, a first sequence of plural data items is rearranged into a second sequence different than the first sequence, based on the change in the context of the computing device. Access to the plural data items is permitted based on a first change with respect to the computing device, the first change being different from the change in the context.

21 Claims, 11 Drawing Sheets

(56) References Cited

U.S. PATENT DOCUMENTS

| | | | |
|---|---|---|---|
| 2010/0095240 A1* | 4/2010 | Shiplacoff | G06F 3/0483 715/784 |
| 2010/0107099 A1 | 4/2010 | Frazier et al. | |
| 2013/0234924 A1 | 9/2013 | Janefalker et al. | |
| 2013/0254705 A1* | 9/2013 | Mooring | G06F 3/0488 715/784 |
| 2014/0160078 A1* | 6/2014 | Seo | G06F 3/04883 345/175 |
| 2015/0022438 A1* | 1/2015 | Hong | H04M 1/7253 345/156 |
| 2015/0049591 A1* | 2/2015 | Adams | G04G 21/08 368/13 |
| 2015/0085621 A1 | 3/2015 | Hong et al. | |
| 2015/0135310 A1 | 5/2015 | Lee | |
| 2015/0242993 A1 | 8/2015 | Raman | |
| 2016/0048200 A1* | 2/2016 | Kim | G04G 21/02 345/173 |
| 2016/0085286 A1* | 3/2016 | Zhou | G06F 1/3215 345/156 |
| 2016/0320850 A1 | 11/2016 | Thadani et al. | |
| 2016/0354042 A1* | 12/2016 | Shim | G06F 21/32 |
| 2016/0358588 A1 | 12/2016 | O'Neill | |
| 2019/0012045 A1* | 1/2019 | Gilor | G06F 3/0482 |

FOREIGN PATENT DOCUMENTS

| | | |
|---|---|---|
| WO | 2015/100224 A1 | 7/2015 |
| WO | 2016/090483 A1 | 6/2016 |

OTHER PUBLICATIONS

Written Opinion dated Dec. 7, 2018, issued by the International Searching Authority in counterpart International Patent Application No. PCT/KR2018/010157 (PCT/ISA/237).

* cited by examiner

700

Sensors Readings

20"

S1: (1.23, 2.34, 9.65)
S2: 45°
S3: 20"
S4: (40°33'13"N,
     3°12'26.5"E)

App UI
Transition 1

18"

S1: (1.23, 2.34, 9.65)
S2: 45°
S3: 18"
S4: (40°33'14"N,
     3°12'26.5"E)

13:55
♡
102

App UI
Transition 2

16"

S1: (1.23, 2.34, 9.65)
S2: 45°
S3: 16"
S4: (40°33'15"N,
     3°12'26.5"E)

7940 steps

App UI
Transition 3

14"

S1: (1.23, 2.34, 9.65)
S2: 45°
S3: 14"
S4: (40°33'16"N,
     3°12'26.5"E)

Music Player

| S1 | Accelerometer |
| S2 | Gyroscope |
| S3 | IR Proximity Sensor |
| S4 | GPS |

114     702     102     210

SWITCHING DATA ITEM ARRANGEMENT BASED ON CHANGE IN COMPUTING DEVICE CONTEXT

CROSS-REFERENCE TO RELATED APPLICATION(S)

This application is based on and claims priority under 35 U.S.C. § 119(a) from Indian Patent Application No. 201711031414, filed on Sep. 5, 2017 in the Intellectual Property Office, the disclosure of which is incorporated by reference herein in its entirety.

BACKGROUND

1. Field

The present disclosure relates to access methods and, in particular, relates to accessing data items on a computing device.

2. Description of Related Art

Besides communication capabilities, computing devices, such as smartphones and tablets, enable users to perform a variety of tasks and activities. For instance, users nowadays can book movie tickets and flight tickets, perform banking tasks, obtain weather information, monitor physiological parameters, obtain driving directions, access multimedia content, and perform several other activities and tasks using such computing devices. For performing any of the aforementioned activities/tasks, a user typically accesses a data item, for example, an application, related to the activity/task.

With advancement in technology, wearable computing devices, such as smartwatches, are growing in popularity. The popularity of such wearable computing devices may be attributed to several factors, such as ease of access and portability. The wearable computing device provides the users with similar ability as that of the computing device to perform the aforementioned activities/tasks. Moreover, accessing of the data items in such wearable computing devices is achieved in a manner similar to that of the computing devices. That is, for accessing data items on a wearable computing device (worn on a hand by a user), the user has to operate the wearable computing device using the other hand. As an example, for accessing a music player application on the smartwatch, the user has to perform a swipe gesture or a bezel rotation action with the hand that is not wearing the smartwatch in order to access the music player application. As may be observed, a basic utility access action thus, requires many steps to accomplish. Additionally, accessing of the data item is further complicated when the data item is ordered at the end of a sequence in which the data items are arranged on the wearable computing device. In such a case, multiple swipe gestures or bezel rotations are required, which may complicate the access to the data item.

SUMMARY

It is an aspect to provide a method and computing device that addresses at least one of the aforementioned deficiencies.

According to an aspect of one or more exemplary embodiments, there is provided method comprising detecting a change in a context of a computing device; in response to detecting the change, rearranging a first sequence of a plurality of data items into a second sequence different than the first sequence, based on the change in the context of the computing device; and permitting access to the plurality of data items based on at least a first change with respect to the computing device, the first change being different from the change in the context.

According to another aspect of one or more exemplary embodiments, there is provided a computing system comprising a memory configured to store computer program code; and at least one processor configured to access the memory and operate according to the computer program code, the computer program code including context management code configured to cause the at least one processor to detect a change in a context of a computing device; application management code configured to cause the at least one processor to, in response to detecting the change in the context of the computing device, rearrange a first sequence of a plurality of data items into a second sequence different than the first sequence, based on the change in the context of the computing device; and view generator code configured to cause the at least one processor to permit access to the plurality of data items based on a first change with respect to the computing device, the first change being different from the change in the context.

BRIEF DESCRIPTION OF THE DRAWINGS

The above and other features, aspects, and advantages will become better understood when the following detailed description is read with reference to the accompanying drawings in which.

DETAILED DESCRIPTION

Figure 1:
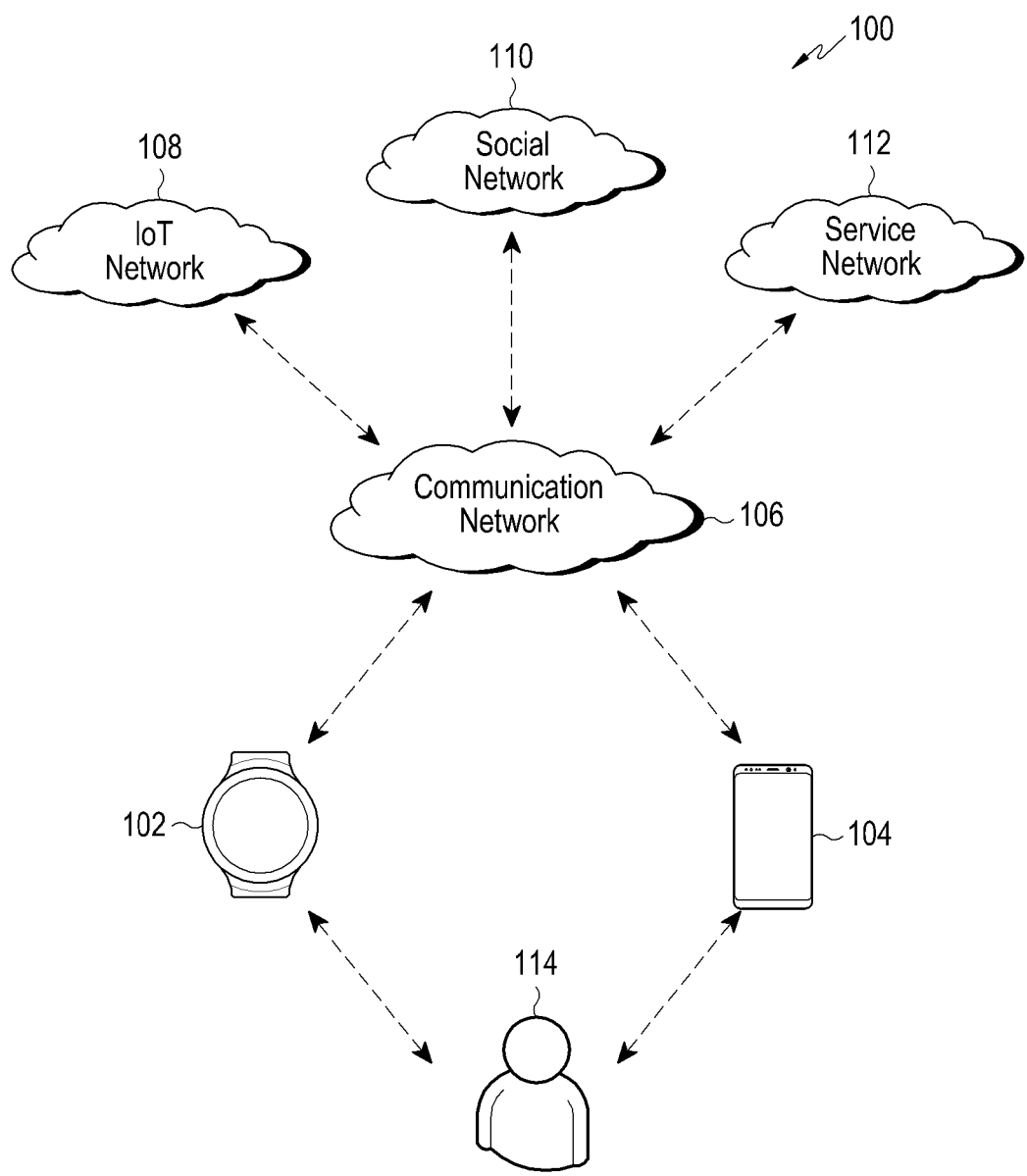
FIG. 1 illustrates a network environment implementing a computing device in accordance with an exemplary embodiment.

For the purpose of promoting an understanding of various exemplary embodiments, reference will now be made to the exemplary embodiments illustrated in the drawings and specific language will be used to describe the same. It will nevertheless be understood that no limitation of the scope of the appended claims is thereby intended, such alterations and further modifications in the illustrated system, and such further applications of the principles of the various exemplary embodiments as illustrated therein being contemplated as would normally occur to one skilled in the art.

Further, skilled artisans will appreciate that elements in the drawings are illustrated for simplicity and may not have been necessarily drawn to scale. For example, the flow charts illustrate the method in terms of the steps involved to help to improve understanding of aspects of the exemplary embodiments. Furthermore, in terms of the construction of the device, one or more components of the device may have been represented in the drawings by conventional symbols, and the drawings may show only those specific details that are pertinent to understanding the exemplary embodiments so as not to obscure the drawings with details that will be readily apparent to those of ordinary skill in the art having benefit of the description herein.

It will be understood by those skilled in the art that the foregoing general description and the following detailed description are explanatory and are not intended to be restrictive of the appended claims.

Reference throughout this specification to "an aspect", "another aspect" or similar language means that a particular feature, structure, or characteristic described in connection with the exemplary embodiment is included in at least one exemplary embodiment disclosed herein. Thus, appearances of the phrase "in an exemplary embodiment", "in another exemplary embodiment" and similar language throughout this specification may, but do not necessarily, all refer to the same exemplary embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Exemplary embodiments will be described below in detail with reference to the accompanying drawings.

FIG. 1 illustrates a network environment 100 of a wearable computing device 102, according to an exemplary embodiment. In an example, the network environment 100 includes the computing device 102, another computing device 104, a communication network 106, an Internet of Things (IoT) network 108, a social network 110, and a service network 112.

In an example, the computing device 102 may be a wearable computing device, for example, a smartwatch. Examples of the another computing device 104 may include, but are not limited to, a smartphone, a tablet, a phablet, a personal digital assistant, and the like.

The communication network 106 may be a wireless network, a wired network, or a combination thereof. The communication network 106 may also be an individual network or a collection of a plurality of individual networks, interconnected with each other and functioning as a single large network, such as, for example, the Internet or an intranet. The communication network 106 may be implemented as one of different types of networks, such as intranet, local area network (LAN), wide area network (WAN), the internet, and such. Furthermore, the communication network 106 may implement various wired or wireless communication protocol, such as Bluetooth and/or Wi-Fi, for facilitating interconnection between various network devices and other devices connected through the communication network 106.

The IoT network 108, in an example, may be understood as a network of smart devices, for example, luminous units, refrigeration units, microwave units, television units, and the like. The term smart device, as used herein, may be understood as a device capable of communicating with either one or both of the computing device 102 and the another computing device 104. As may be understood, the IoT network 108 may implement suitable communication protocols and standards for facilitating communication between the smart devices, the computing device 102, and the another computing device 104. Further, in an example, the smart devices may be operated using the computing device 102 and/or the another computing device 104. The social network 110 may be understood as a network comprising one or more servers implemented by companies rendering social media platforms and social media services to users. The service network 112 may be understood as a network comprising one or more servers implemented by various service providers, such as weather monitoring service provider, email service provider, communication service provider, messaging service provider, multimedia service provider, and the like. As may be understood, the IoT network 108, the social network 110, the service network 112, may include suitable infrastructure, hardware, and network elements, for facilitating communication with either one or both of the computing device 102 and the another computing device 104.

In an example, a user 114 may use the computing device 102 for performing various activities and tasks. For example, the user 114 may send/receive emails/messages through the service network 112. In another example, the user 114 may monitor his/her physiological parameters using one or more sensors of the computing device 102. In yet another example, the user 114 may access multimedia content using the computing device 102. In yet another example, the user 114 may perform post or receive notifications related to social media posts from the social network 110. In a further example, the user may receive notification related to smart devices of the IoT network 108. For performing the aforementioned tasks, the computing device 102 may include one or more data items, such as applications, related to the activities/tasks. For instance, for sending and receiving emails, the computing device 102 may include an email application. For accessing multimedia content, for example, music files, the computing device 102 may include a corresponding music player application.

In the related art, the data items of the computing device 102 may be arranged in a predefined sequence and, for accessing the data items, the user 114 may provide a user input, such as a swipe gesture or a rotation of a bezel provided on the computing device 102. As may be understood, the user 114 may wear the computing device 102 on one hand and may provide the user input through the other hand. Accordingly, accessing the data items on the computing device 102 in such a manner as in the related art may prove to be a cumbersome task. For instance, in a case when the user 114 is driving or jogging, the user 114 may have to stop the vehicle or stop his jogging activity, in order to access the data items. Further, since the data items are arranged in a fixed sequence, accessing a data item for which a notification is received may require multiple swipe gestures or bezel rotation clicks if the data item is at the farther end of the sequence. Thus, accessing the data items in the aforementioned manner is a cumbersome task.

According to aspects of various exemplary embodiments, the user 114 is permitted access to the data items based on a distance between a body part, for example, a face of the user 114, and the computing device 102, and/or a direction of movement of the computing device 102. Thus, the user 114 may access the data items comfortably by a simple movement of the hand, i.e., by a single hand. Furthermore, the data items residing on the computing device 102 may be arranged in a sequence based on contextual data. As a result, data items that are determined to be contextually relevant to the user 114 are arranged earlier in the sequence. Thus, contextually relevant data items are provided first to the user. The contextual data, in an example, may include location data, physiological data, and/or network data. The location data may include a current location of the user and/or previously recorded locations of the user at different times. The physiological data may include a current heart rate, a current blood pressure, and/or previously recorded heart rate and blood pressure of the user 114. The network data may include, social feeds, such as social media posts and tweets, email messages, text messages, multimedia messages, messages from smart devices of the IoT network 108, and the like. Based on the contextual data, a relevancy indicator for each of the data items may be determined, and accordingly, the data items may be arranged in the sequence.

As an example, the user 114 may be wearing the computing device 102 and may go out jogging. Prior to commencement of the jogging, the data items of the computing device 102 may be arranged in a first sequence that is either user defined or defined by the computing device 102. When the user 114 starts jogging, a change in the physiological parameter, for example, heart rate, of the user 114 may be detected by a sensor of the computing device 102. Additionally, a notification related to a social media application may also be received by the computing device 102. Based on the aforementioned events, a physiology monitoring data item and a social media data item may be arranged earlier in the sequence and thus, a second sequence of the data items is determined. In such a case, i.e., during jogging, whenever the user 114 accesses the data items, the physiology monitoring data item and the social media data item will be provided earlier. For accessing the data items, the user 114 may look at the watch and may subsequently move the watch towards his face. On detecting the movement of the hand of the user 114 on which the computing device 102 is mounted, the computing device 102 permits access to the data items, with the physiological monitoring data item and the social media data item being provided first. Thus, the user 114 may conveniently access the data items with minimal efforts. Furthermore, contextual relevant data items are provided to the user first thereby further reducing the efforts required to access such data items.

Figure 2:
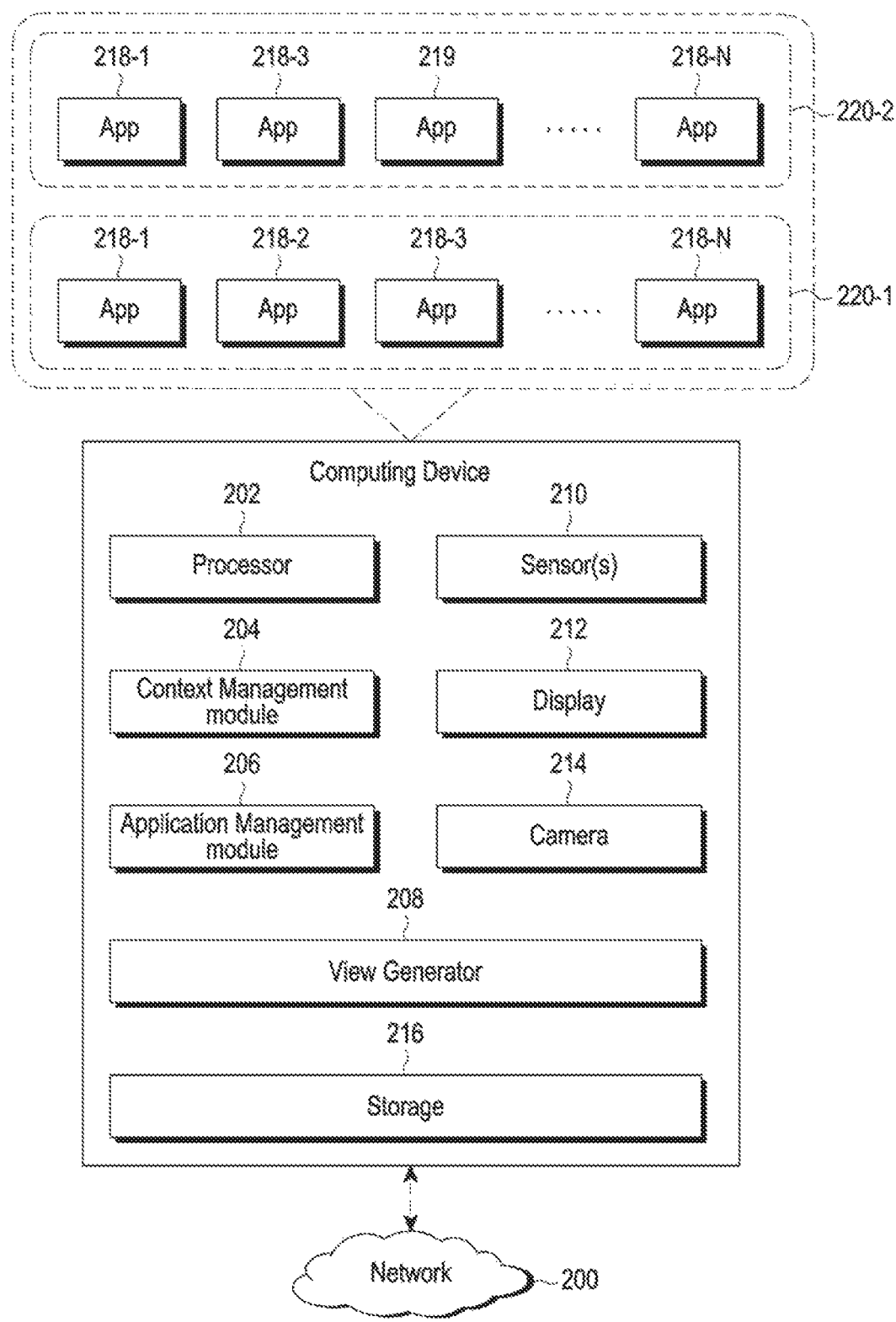
FIG. 2 illustrates a computing device, in accordance with an exemplary embodiment.

FIG. 2 illustrates an example of the computing device 102, according to an exemplary embodiment. In an example, the computing device 102 may be connected to a network 200 that includes the network 106, the IoT network 108, the social network 110, and/or the service network 112.

The computing device 102 may include a processor 202, a context management module 204, an application manager 206, a view generator 208, one or more sensor(s) 210, a display 212, a camera 214, and a storage 216. The context management module 204, the application manager 206, and the view generator 208 may be implemented as, signal processor(s), state machine(s), logic circuitries, and/or any other device or component that manipulate signals based on operational instructions. Further, the context management module 204, the application manager 206, and the view generator 208 may be implemented in hardware, instructions executed by a processing unit, or by a combination thereof. The processing unit can comprise a computer, a processor, such as the processor 202, a state machine, a logic array or any other suitable devices capable of processing instructions. The processing unit may be a general-purpose processor, which executes instructions that cause the general-purpose processor to perform required tasks, or, the processing unit may be dedicated to perform the required functions. In another example, the context management module 204, the application manager 206, and the view generator 208 may be machine-readable instructions (software) which, when executed by a processor/processing unit, perform any of the described functionalities.

The one or more sensors 210 may include one or more of an accelerometer, a gyroscope, a compass, a magnetometer, a global positioning system (gps) chip, a proximity sensor, a microphone, an ambient light sensor, and the like. The display 212 may include a display screen for rendering data items to the user 114. The storage 216 may be a repository/storage medium/data store, for storing data processed, received, and generated by one or more of the context management module 204, the application manager 206, the view generator 208, and the one or more sensor(s) 210. Further, the storage 216 may include usage data, such as frequency of usage, time of usage, time since last usage, and the like, related to data items stored on the computing device 102.

The computing device 102, in an example, may include a plurality of data items. Examples of the data items include, but are not limited to, an application, a folder, a webpage, and a multimedia file. For the sake of brevity, the plurality of data items is depicted as applications (Apps) 218-1 to 218-N, (collectively referred to as Apps 218, and individually referred to as an App 218) in FIG. 2 and, the following description is described in reference thereto. However, as will be appreciated, the data items could be any of the aforementioned examples.

According to an example, the application manager 206 may store the Apps 218 in a first sequence 220-1. The first sequence may be based on one or more of a name, a usage, a pre-defined order, an installation sequence, and a memory usage of the Apps 218. As an example, the application manager 206 may receive a user input defining the order of Apps 218 from the user 114. Based on the user input, the application manager 206 arranges the Apps 218 in the first sequence. In another example, the application manager 206 may arrange the Apps 218 in the first sequence in an alphabetical order based on the names of the Apps 218. In yet another example, the application manager 206 may arrange the Apps 218 in the first sequence in alphabetical order and based on memory usage. That is, the Apps 218 may be sorted in different ways and using different hierarchies, such as alphabetical order by name, and then from largest to least memory usage, or in the opposite, first based on memory usage and then according to alphabetical order by name, etc.

In operation, the view generator 208 permits access to the Apps 218 based on detection of a first change with respect to the computing device 102. In an example, the detection of the first change may include detection of a change in a state of the computing device 102 from a sleep state to an active state and/or a change in an orientation of the computing device 102 from a first orientation to a second orientation. Furthermore, the detection of the first change may include detecting a movement of the computing device 102 from a current position to a different position. In an example, the view generator 208 may permit the access to the Apps 218 when the first change is detected in a defined order. For instance, the view generator 208 may permit the access on detecting the change of the state from sleep state to active state first, followed by detecting a movement of the computing device 102. On the other hand, in a case where the view generator 208 detects only a movement of the computing device 102, the view generator 208 may not permit the access to the Apps 218. For instance, when the user 114 is casually swinging his hand, the view generator 208 may not permit access to the Apps 218. Permitting access to the Apps 218, as used herein, may be understood as displaying an App 218 for selection, or as displaying and making available an App 218 for selection.

For detecting the first change with respect to the computing device 102, the view generator 208, in an example, constantly monitors data collected by the one or more sensor(s) 210, hereinafter referred to as sensor data. As may be understood, when the computing device 102 is operational, i.e., in an on state, the one or more sensor(s) 210 may constantly or periodically record data and readings. For example, the one or more sensor(s) 210 may record one or more of orientation readings, movement readings, accelerometer readings, location readings, physiological readings of the user 114, and the like. All such readings and data, in an example, may be recorded and stored as the sensor data in the storage 216. As may be understood, the sensor data may include one or more of location data, physiological data, orientation data, motion data, and the like.

In an example, when the orientation readings and the movement readings matches a predefined pattern, the computing device 102 may switch from a sleep state to an active state. On detecting this change from the sleep state to the activated state, the view generator 208 permits access to the first App 218-1 in the sequence 220-1. For instance, a clock dial display may be displayed to the user 114. At this instant, the view generator 208 records the position of the computing device 102 as a current position. Additionally, at the same instant, the view generator 208 triggers the camera 214. Based on the feed, i.e., an image, a video, or a frame, from the camera 214, the view generator 208 may detect a body part, for example, a face of the user 114.

On detecting the face of the user 114, the view generator 208 may activate a proximity sensor of the computing device 102. The proximity sensor, in an example, computes the distance between the current position of the computing device 102 and the face of the user 114. Based on the distance, the view generator 208 determines an app switch interval. The app switch interval may be understood as a unit distance at which access to a further App 218 is permitted to the user 114. In an example, the further App 218 may be a next App or a previous App in the first sequence 220-1. For determining the app switch interval, the view generator 208, in an example, divides the distance by a number of the Apps 218 present in the first sequence 220-1. As an example, when the distance is twenty inches and the first sequence 220-1 has ten apps, the view generator 208 may determine the app switch interval to be two inches. Thus, after every two inches of movement of the computing device 102, the view generator 208 may permit access to a different App 218.

In an example, based on the app switch interval and the sensor data, the view generator 208 may permit access to the further App 218. For instance, based on the sensor data, the view generator may detect movement of the computing device from the current position to a further position. Based on the current position and the further position, the view generator 208 may compute the distance moved by the computing device 102. In addition, the view generator 208 may identify a direction of the movement. In a case where the distance is equal to or greater than the app switch interval, the view generator 208 may permit access to the further App 218. In an example, when the movement of the computing device 102 is towards a first direction, the view generator 208 determines the further App 218 to be the next App in the first sequence 220-1. For instance, when the user 114 moves the computing device 102 towards his face by one App switch interval, the view generator 208 may permit the access to the next App, say, App 218-2. At this instant, a position where the App 218-2 is permitted access to becomes the current position. In another example, when the movement of the computing device 102 is towards a second direction, the view generator 208 determines the further App 218 to be the Previous app in the first sequence 220-1. For instance, assuming the computing device 102 is at a current position in which the App 218-2 is permitted access, when the user 114 moves the computing device 102 away from the face by one App switch interval, the computing device 102 may permit access to the Previous app, i.e., the App 218-1. In an example, the direction of the movement may be along either one of the horizontal axis or the vertical axis.

Thus, as may be gathered, during successive movements of the computing device 102 towards the user 114, where each successive movement is greater than the app switch interval, the user 114 is permitted access to the Apps 218-2, 218-3, and so on and so forth. On the other hand, when the user 114 is at, say, App 218-5 and the computing device 102 is moved away from the user 114, for each movement greater than the app switch interval, the user 114 is permitted access to the Apps 218-4, 218-3, 218-2, and so on and so forth.

In an example, based on detection of a second change with respect to the computing device 102, the view generator 208 may permit further access to an App 218. In some exemplary embodiments, the second change may be different from the first change. The detection of the second change, in an example, may include detecting a change in an orientation of the computing device 102 from a first orientation to a second orientation different from the first orientation and a change in an orientation of the computing device 102 from the second orientation to the first orientation. In other words, on detecting a 'to and fro' movement (i.e., a rotational movement) of the computing device 102, further access to an App 218 currently being displayed on the display device 212 is permitted. On permitting further access, the view generator 208 may provide access to one or more menus/functions of the App 218. The detection of the second change may further include a movement of the computing device 102 from a first position to a second position different from the first position. On detecting such a movement, the view generator 208 may permit access to the menus/functions of the App 218. As an example, the user may seek to access an App 218-3, which is currently being displayed on the display 212. For accessing the App 218-3, the user 114 may provide a user input, for example, a 'to and fro' movement of the wrist, which is detected and recorded by the one or more sensor(s) 210 in the sensor data. On detecting such a movement and based on the sensor data related thereto, the view generator 208 may permit access to one or more menus/functions of the App 218-3. In an example, on accessing the menus/functions of the App 218-3, the user 114 may move the computing device 102. On detecting the movement of the computing device 102, the view generator 208 may permit access to the one or more menus/functions in a manner as described above with reference to permitting access to the Apps 218.

The foregoing description may be understood as a first method of accessing the Apps 218, where the Apps 218 are arranged in the first sequence 220-1, and where the access to the Apps 218 is permitted based on the detection of the first change with respect to the computing device 102.

In an example, the application management module 206 may fix the position of an App 218 at a predetermined position in the first sequence based on a user input of the user 114. For instance, the user 114 may provide a user input, such as a long tap, selection of a corresponding action box related to the App 218, and the like. The user input may further indicate a position at which the App 218 is to be fixed. Based on the user input, the application management module 206 fixes the position of the App at the predetermined position. Further, in an example, the application management module 206 may set a position flag for the App 218. The position flag, if set, serves as an indicator that the App 218 is to be fixed at the predetermined position. As an example, the user 114 may seek to fix the position of a clock dial at the first position and may provide the user input in relation thereto. Based on the user input, the application management module 206 may fix the position of the clock dial app at the first position. Thus, the clock dial app is always displayed first to the user 114 when the computing device 102 switches from the sleep state to the active state.

In an example, the context management module 204 may monitor the sensor data, and network data, for detecting a change in a context of the computing device 102. As mentioned above, the sensor data may include the location data and the physiological data. The location data, in an example, may include current location coordinates of the computing device 102, and previously recorded location coordinates of the computing device 102. The physiological data may include current and previously recorded physiological parameters values associated with the user 114. The network data may include social media posts, emails, text messages, messages or notifications related to the smart devices, messages related to one or more services availed by the user 114, and the like.

The change in the context of the computing device 102 may include at least one of:
- a continuous change in a location of the computing device for a pre-defined time duration;
- at least one physiological parameter of the user being greater than a predefined threshold value;
- receipt of a notification related to at least one of the Apps 218; and
- receipt of a notification from a further computing device communicatively coupled to the computing device 102.

By monitoring the sensor data and the network data, the context management module 204 may detect the change in the context of the computing device 102. For instance, when the user 114 commences travel from a location A to a location B, the sensor 210 may detect a continuous change in the location of the computing device 102. In a case where the location is changing continuously for the pre-defined time duration, the context management module 204 may detect the satisfaction of the fourth set of rules. In an example, in addition to detecting the change in the location for the pre-defined time duration, the context management module 204 may determine the change in the context based on additional parameters. For instance, the context management module 204 may determine the change in the context of the computing device 102 based on a speed of the computing device 102 when the location is changing. That is, in a case where the speed of change of location is greater than a pre-defined speed, the context management module 204 may detect the change in the context of the computing device 102. In another example, the user 114 may be out for jogging. During jogging, a physiological parameter, for example, a heart rate, of the user 114 may increase. In an example, when the heart rate value is greater than the predefined threshold value, the context management module 204 may detect the change in the context of the computing device 102. In yet another example, on receiving an email/message related to an email/messaging application, the context management module 204 may determine the change in the context of the computing device 102. In yet another example, on receiving a notification from a smart device of the IoT network 108, the context management module 204 may determine the change in the context of the computing device 102.

Upon detecting the change in the context of the computing device 102, the context management module 204 may compute a contextual score for each of the Apps 218. The contextual score, in an example, may be based on at least one of an app score, a context score, and a usage score, related to an App 218. The app score may be understood as a predetermined score associated with the App 218. The context score may be understood as a predetermined score associated with a context. Thus, upon satisfaction of the rule for the App 218, the context score corresponding to the detected context associated with the App 218. For instance, in reference to the above described examples, the context management module 204 may determine a contextual score for each of a location application, a heart rate monitoring application, an email/messaging application, and an IoT application. In a case, if no context is determined to be satisfied for the App 218, for example, a music application, the contextual score for the App 218 is zero. The usage score is a score determined based on usage data associated with the App 218. The usage score may be based on one or more factors, such as a number of times the App 218 is used, a time at which the App 218 is used, and the like. In an example, the context management module 204 may determine the usage score for the App 218 based on the usage data. Thus, based on the app score, the context score, and the usage score, the context management module 204 computes the contextual score for each of the Apps 218. The contextual scores for the Apps 218 may be stored in the storage 216, in an example. In an example, in addition to computing the contextual scores for the Apps 218, the context management module 204 may compute contextual scores for other apps of the computing device 102.

In an example, in addition to determining the contextual scores on detecting the change in the context of the computing device 102, the processor 202 may implement a second method of accessing the Apps 218. In the second method, the application management module 206 arranges the Apps 218 based on the change in the context. For instance, the application management module 206 analyzes the contextual scores corresponding to the Apps 218 computed upon detecting the change in the context of the computing device 102. Based on the analysis, the application management module 206 arranges the Apps 218 in a second sequence 220-2. For arranging of the application 218 in the second sequence, the application management module 206 may perform at least one of:
- repositioning of at least one app from the Apps 218 arranged in the first sequence;
- adding at least one app to the Apps 218;
- removing at least one app from the Apps 218; and
- affixing at least one App 218 at a predetermined position in the second sequence.

As an example, the application management module 206 may determine that the position flag for the App 218-1 is set. Thus, the application management module 206 may fix a position of the App 218-1 at the predetermined position, say, a first position. In another example, the application management module 206 may reposition the App 218-3 from third position to the second position, as shown in the second sequence 220-2 of FIG. 2. In yet another example, the application management module 206 may remove the App 218-2 on determining contextual score corresponding to the App 218-2 to be below a predefined threshold or lowest amongst the Apps 218. In yet another example, the application management module may include an App 219 in the app sequence 220-2 based on corresponding contextual score, as shown in the second sequence 220-2 of FIG. 2.

Following description presents further examples related to arranging of the apps in accordance with various exemplary embodiments. Table 1 illustrated below depicts a plurality of Apps of a wearable computing device, such as the computing device 102, arranged in a first sequence. Table 1 further includes a position of the Apps in the sequence, a corresponding contextual score for each of the Apps, and flag information associated with each of the Apps. The flag information, in an example, is indicative that the App is to remain fixed at the designated position.

TABLE 1

| Application | Position in the sequence | Contextual Score | Flag set |
| --- | --- | --- | --- |
| Clock | 1 | 5.7 | Yes |
| Music Player | 2 | 5.4 | No |
| Health Monitoring | 3 | 5.1 | No |
| Email Client | 4 | 4.9 | No |
| Social Media | 5 | 4.8 | No |
| Message Inbox | 6 | 4.0 | No |

Threshold contextual score = 3.0

Consider a scenario where a user of the wearable camera device is at his home location and is in a state of rest. At this instant, the user receives an email and, a tweet from a friend. Further, at the same instant, it is determined that no text message has been received. Based on the aforementioned activities, the wearable computing device may update the contextual scores, as illustrated below in Table 2.

TABLE 2

| Application | Position in the sequence | Contextual Score | Flag set |
| --- | --- | --- | --- |
| Clock | 1 | 5.7 | Yes |
| Email Client | 2 | 5.8 | No |
| Social Media | 3 | 5.5 | No |
| Music Player | 4 | 5.4 | No |
| Health Monitoring | 5 | 5.1 | No |
| Message Inbox | NA (removed from sequence) | 2.8 | No |

As illustrate in Table 2, the email client and the social media application are re-arranged to arrive at a second sequence. Further, the message inbox application is removed from the second sequence as the corresponding score is below a threshold contextual score of 3. Also, since the flag is set for the clock, the clock is not re-arranged despite the corresponding contextual score of the clock being lower than the email client.

Continuing with the second method, the view generator module 208 may permit access to the Apps 218 arranged in the second sequence 220-2 based on detection of the first change with respect to the computing device 102, in a manner as described earlier in the first method.

Furthermore, as may be gathered from the foregoing description, in an example, the first change and the second change with respect to the computing device 102 and the change in the context are different from each other. However, in some exemplary embodiments, the first change, the second change, and the change in context may be the same.

Figure 3:
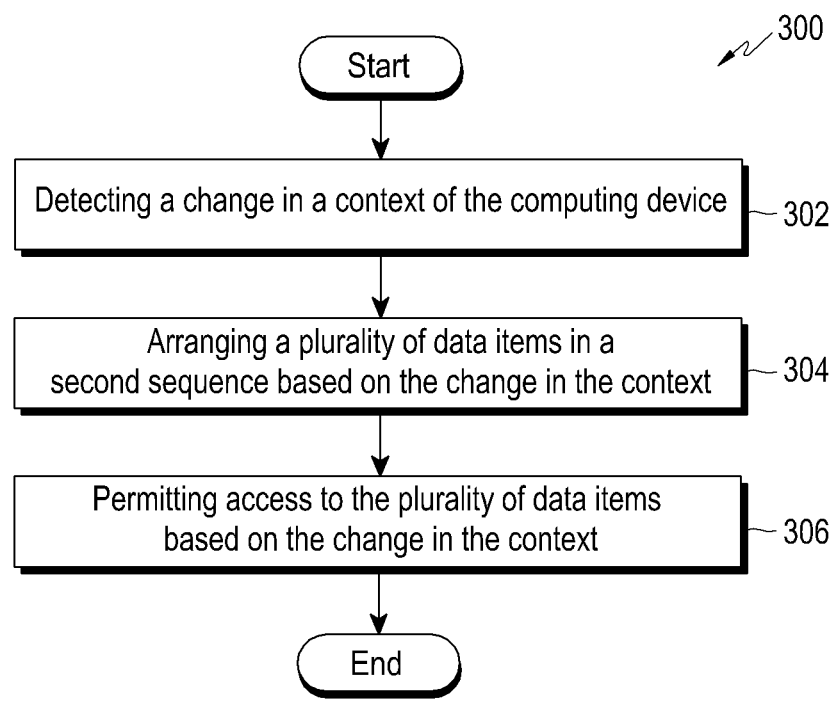
FIG. 3 illustrates an exemplary method for accessing data items on a computing device, in accordance with an exemplary embodiment.

FIG. 3 illustrates an exemplary method 300 for accessing data items on a computing device 102, according to an exemplary embodiment. The order in which the method 300 is described is not to be construed as a limitation, and any number of the described method blocks may be combined in any order to implement the method 300, or an alternative method. Additionally, individual blocks may be deleted from the method 300 without departing from the scope of the subject matter described herein. Furthermore, the method 300 may be implemented in any suitable hardware, software, firmware, or combination thereof.

Referring to block 302, a change in a context of the computing device 102 is determined. For determining the change in the context, the context management module 204 may monitor the sensor data and the network data. Based on the sensor data and the network data, the change in the context of the computing device 102 may be determined. For example, based on the network data, it may be determined that a notification for a data item of the computing device 102 has been received. The receipt of the notification results in a change in the context of the computing device 102. On detecting the change in the context of the computing device 102, a contextual score for each of the data items of the computing device 102 may be computed. In an example, upon determining the change in the context of the computing device 102, a second method of permitting access to a plurality of data items of the computing device 102 may be implemented.

At block 304, a plurality of data items is arranged in a second sequence based on the change in the context of the computing device 102. In an example, in the second sequence, the plurality of data items is arranged in a descending order of corresponding contextual score. The contextual score associated with a data item may be computed in a manner as described above with reference to FIG. 2. The arrangement of the plurality of data items may include at least one of removal of a data item from the plurality of data items, addition of a further data item to the plurality of data item, repositioning of a data item in the second sequence, and fixing a position of a data item at a predetermined position. As may be understood, in an example, the plurality of data items may be a subset of a set of data items of the computing device 102. For example, if the computing device 102 has 20 data items, the plurality of data items may include only 8 data items from the 20 data items. The 8 data items may then be arranged in the second sequence. In an example, the application management module 206 may arrange the plurality of data items in the second sequence.

At block 306, access to the plurality of data items is permitted based on the change in the context of the computing device 102. In an example, the second change with respect to the computing device 102 may be different from the change in the context of the computing device 102. The detection of the first change may include detecting a change in an orientation of the computing device 102. The detection of the first change may further include detecting a change in a state of the computing device 102 from a sleep state to an active state. The detection of the first change may further include detecting a movement of the computing device 102 from a current position to a further position. Based on the detection of the first change, the view generator module 208 may permit access to the plurality of data items in a manner as described earlier in the description of FIG. 2.

Figure 4A:
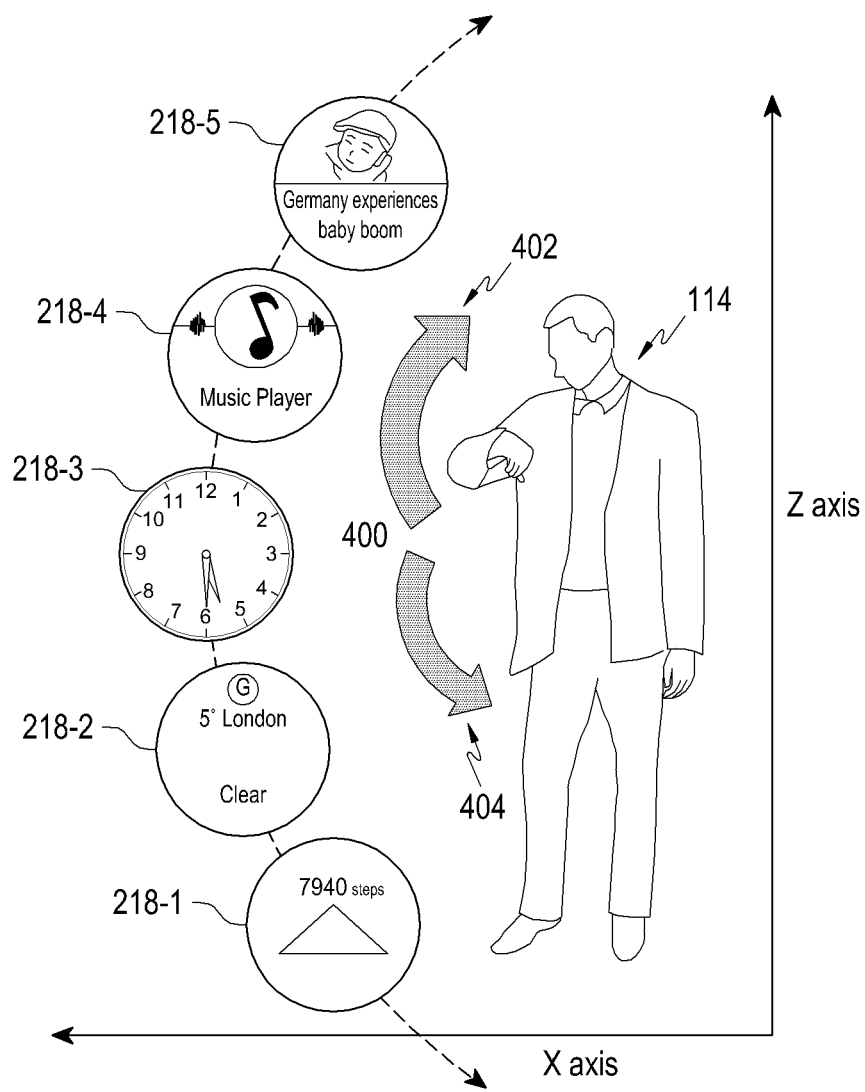
FIGS. 4A-8 illustrate exemplary use cases, in accordance with various exemplary embodiments.

FIGS. 4A-8 illustrate exemplary use cases, in accordance with various exemplary embodiments. Referring to FIG. 4A, the computing device 102 (not shown in FIG. 4A) may be activated at a position 400 (current position). At the current position, access to the App 218-3 may be permitted to the user 114. Subsequent to the activation of the computing device 102, the user 114 may move the computing device 102 from the current position 400 in either a first direction 402 or a second direction 404 along the z-axis, for accessing other Apps 218. The movement of the computing device 102 is further illustrated in conjunction with FIG. 4D later. As illustrated in FIG. 4A, when the user 114 moves the computing device 102 from the current position 400 in the first direction 402, access to the Apps 218-4 and 218-5 is permitted in said order. In another example, when the user 114 moves the computing device 102 from the current position 400 in the second direction 404, access to the Apps 218-2 and 218-1 is permitted in said order. In an example, on detecting a change in the context of the computing device 102 as described above, the Apps 218 of the computing device 102 may be rearranged. For instance, say, from an initial sequence —218-1, 218-2, 218-3 to a new sequence 218-1, 218-4, 218-3. Accordingly, after rearrangement of the Apps 218 when the user 114 moves the computing device 102 from the current position 400 in the first direction or the second direction, access to the Apps 218 is permitted as per the new sequence. Example use cases related thereto will be described below with reference to FIGS. 5-8.

Figure 4B:
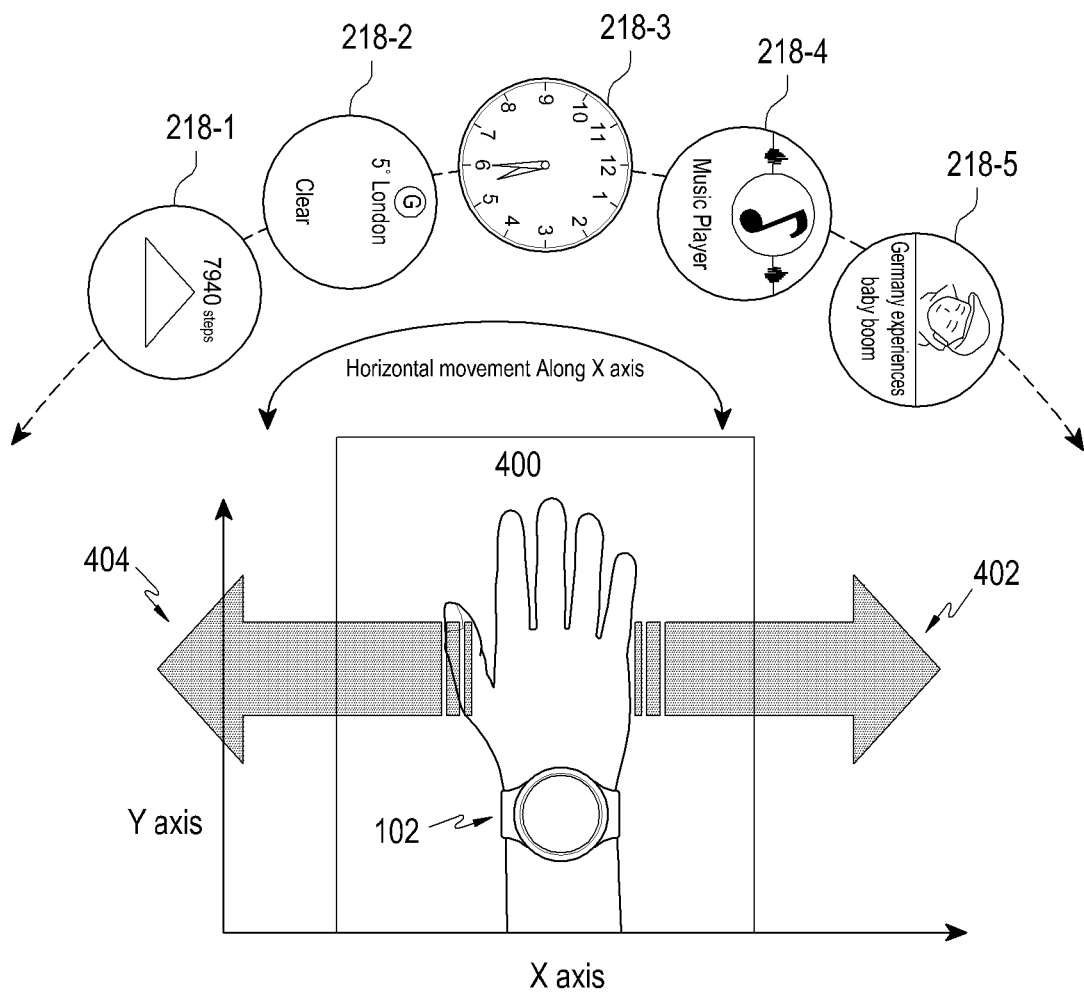

Referring to FIG. 4B, movement of the computing device 102 along the x-axis is shown. As shown in FIG. 4B, on moving the computing device 102 from the current position 400 in the first direction 402, transition of Apps 218 takes place from the App 218-3 to the App 218-5. Similarly, when the computing device 102 is moved from the current position 400 in the second direction 404, transition of the Apps 218 takes place from the App 218-3 to the App 218-1. The movement of the computing device 102 is further illustrated in conjunction with FIG. 4D later. In an example, on detecting a change in the context of the computing device 102 as described above, the Apps 218 of the computing device 102 may be rearranged. For instance, say, from an initial sequence —218-1, 218-2, 218-3 to a new sequence 218-1, 218-4, 218-3. Accordingly, after rearrangement of the Apps 218 when the user 114 moves the computing device 102 from the current position 400 in the first direction or the second direction, access to the Apps 218 is permitted as per the new sequence. Example use cases related thereto will be described below with reference to FIGS. 5-8.

Figure 4C:
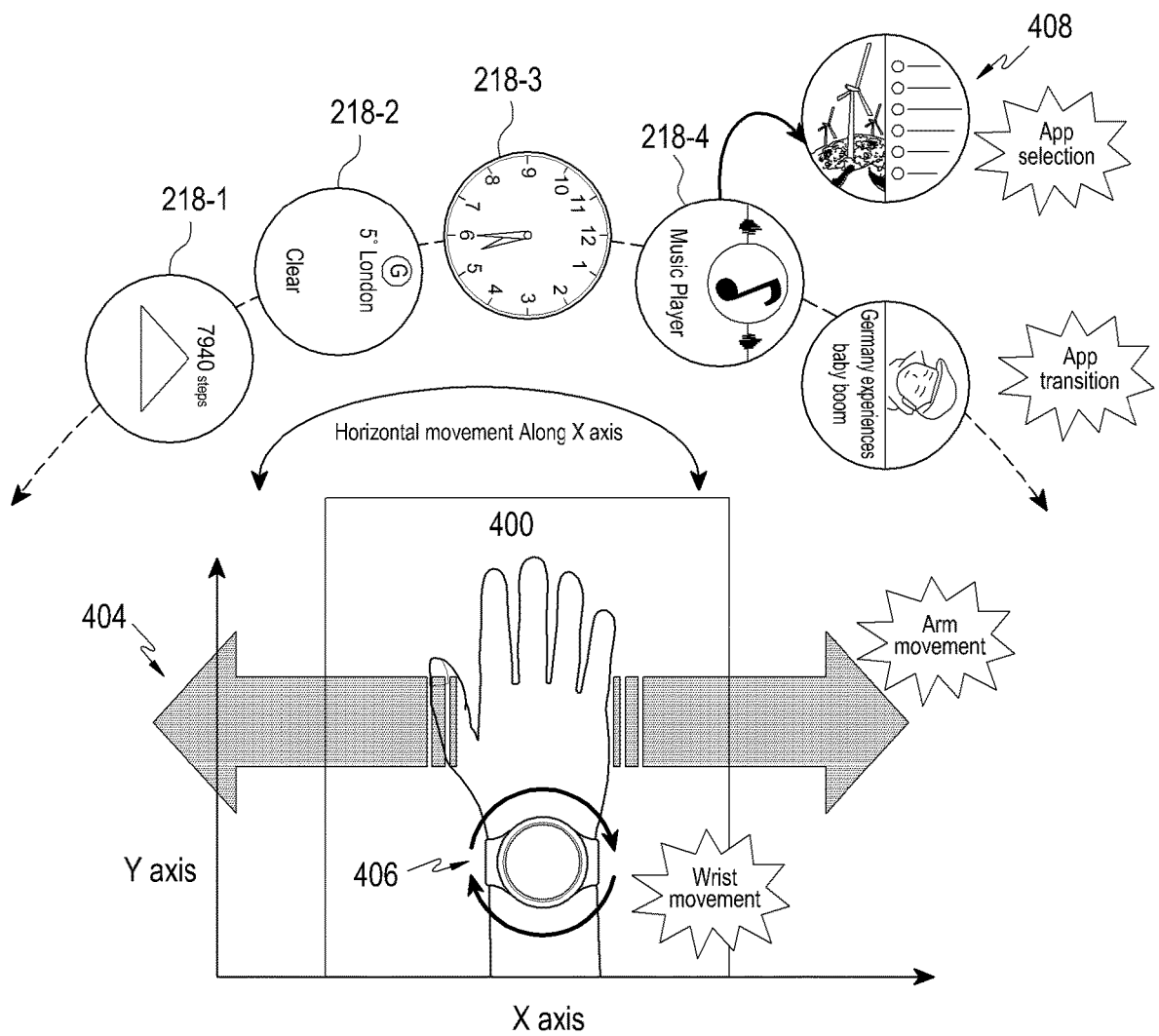

Referring to FIG. 4C, the user 114 may move the computing device 102 from the current position 400 in the first direction 402, and is permitted access to the App 218-4. For selecting the App 218-4, the user 114 may perform a 'to and fro' (i.e., rotational) movement 406 of his wrist. Based on the movement 406, further access to the App 218-4 is permitted and an interface 408 depicting a menu/function of the App 218-4 is displayed to the user 114. Subsequent to the further access, the user 114 may again move the computing device 102 from the position of accessing App 218-4 (which has become the new current position as described above) in either the first direction 402 or the second direction 404 for accessing one or more menus/functions of the App 218-4. In order to select a menu/function of the App 218-4, the user 114 may then perform the movement 406. In an example, on detecting a change in the context of the computing device 102 as described above, the Apps 218 of the computing device 102 may be rearranged. Thus, post re-arrangement, when the user 114 moves the computing device 102 from the current position 400 in the first direction or the second direction, the Apps 218, in a contextually relevant order are presented to the user 114. The user may then further access any of the Apps 218 in a manner as described herein. Example use cases related thereto will be described below with reference to FIGS. 5-8.

Figure 4D:
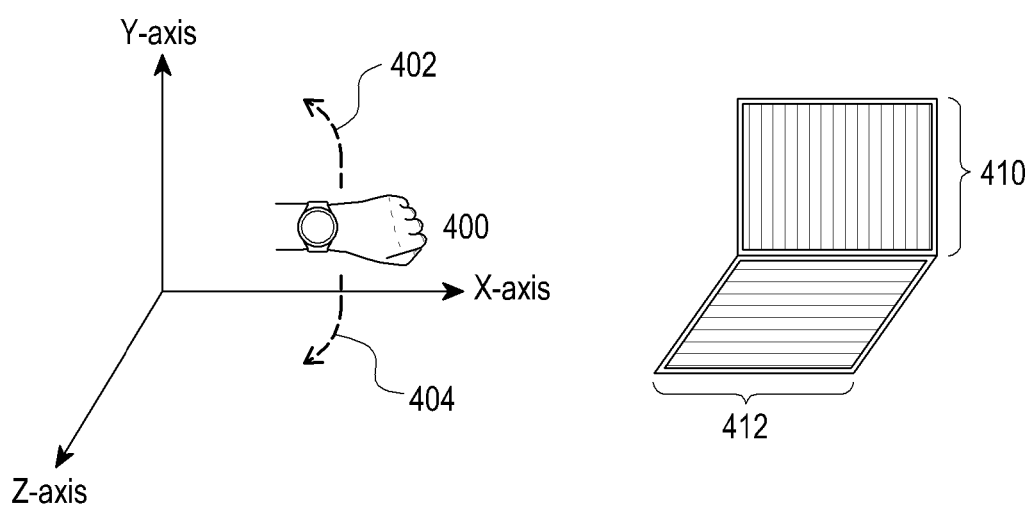

Referring to FIG. 4D, arm movement of the user 114 along the x-y, y-z, and x-z planes (i.e., in X,Y,Z coordinate space) is illustrated. As shown in FIG. 4D, plane 410 represents the x-y plane and plane 412 represents the x-z plane. In an example, considering the plane 410, the user may move the wrist/body part in either the first direction 402 or the second direction 404 along the plane 410 to access the Apps 218. In another case, considering the plane 412, the user may move the wrist/body part in either the first direction 402 or the second direction 404 along the plane 412 to access the Apps 218. As would be appreciated, movement of the wrist/body part in either of the planes 410 or 412 may include movement along the z-axis as well.

Figure 5:
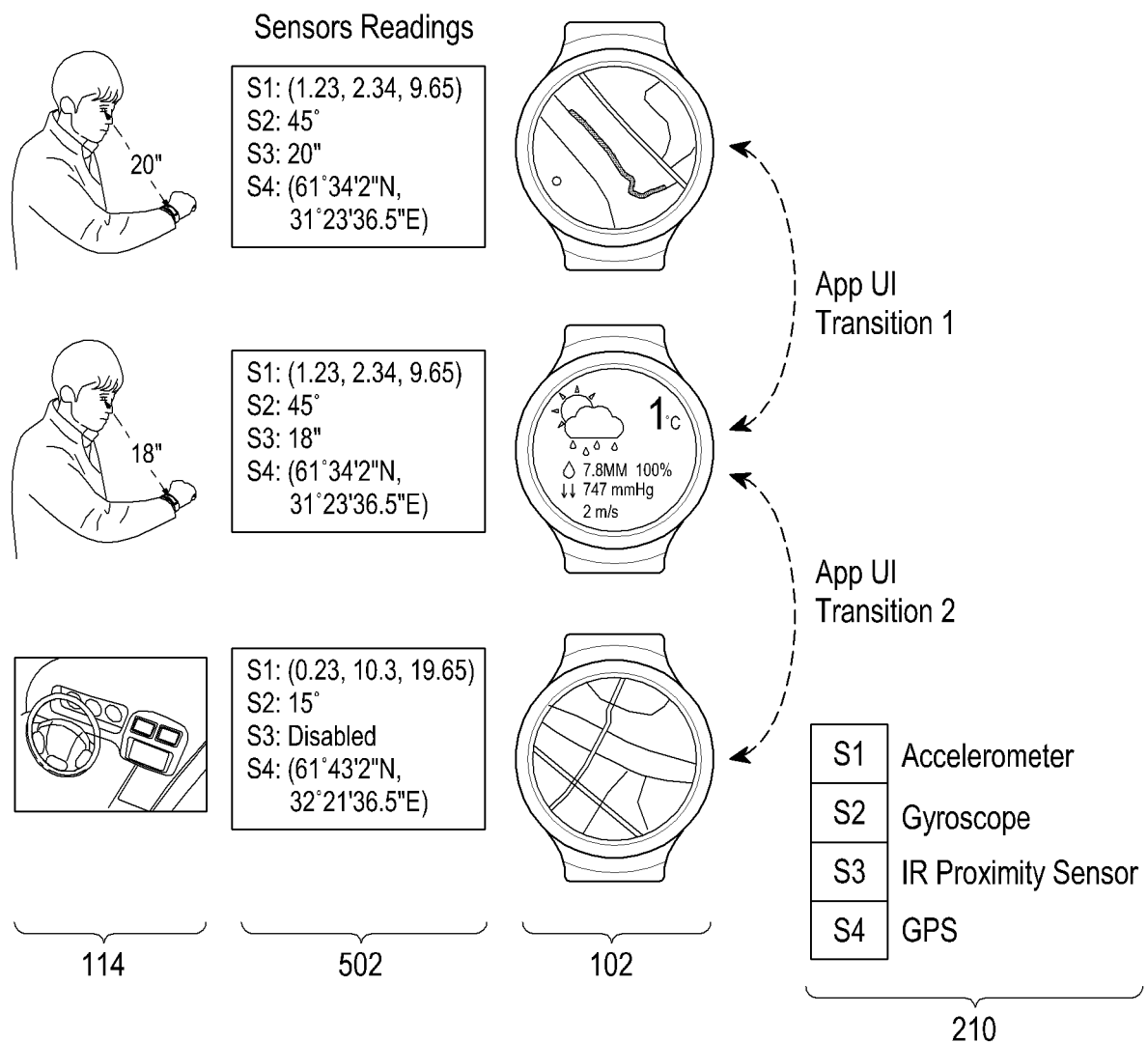

Referring to FIG. 5, a use case 500 is illustrated. In the use case 500, a plurality of Apps of the computing device 102 may be arranged in a first sequence (not shown). For instance, the first sequence may include a clock, a music player, a health app, and a news app, in said order. In said use case 500, the user 114 may access a map application and select a destination location. Subsequently, the user 114 may commence his journey towards the destination location. The one or more sensor(s) 210, in an example, may record sensor readings 502 indicating continuous change in the location of the user 114. Additionally, on detecting selection of the destination location, the computing device 102, in an example, may obtain weather information related to the destination location and may store the same as network data in the storage 216. Based on the network data and the sensor readings 502, the context management module 204, may update the corresponding contextual scores of the maps app and the weather app. Accordingly, based on the updated contextual scores, the application management module 206 arranges the plurality of Apps of the first sequence into a second sequence, where the maps app and the weather app is included in the plurality of Apps. Subsequently, on movement of the computing device 102, the user 114 is permitted access to the maps app and the weather app. In an example, on learning about the weather conditions at the destination location, the user 114 may update the destination location.

Figure 6:
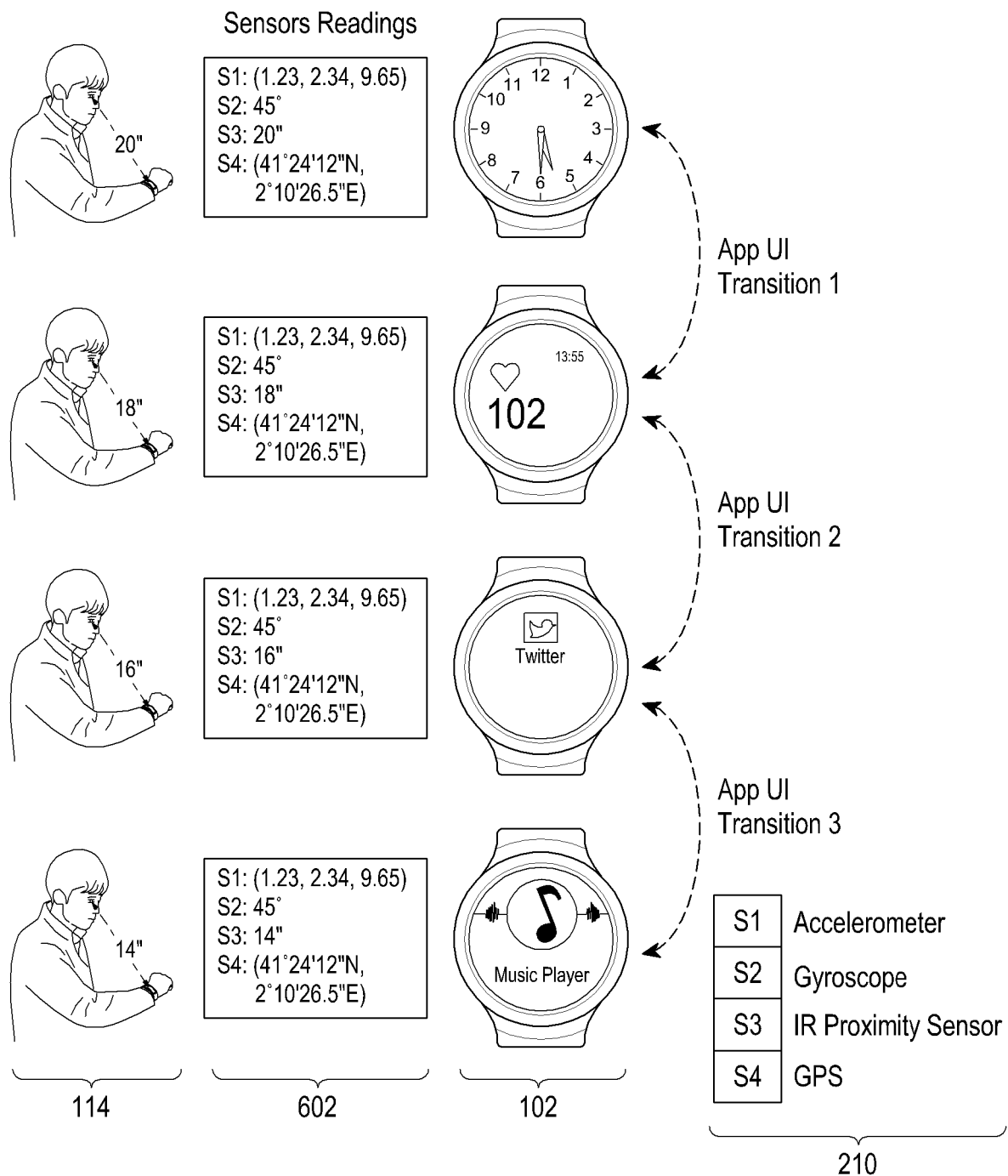

Referring to FIG. 6, a use case 600 is illustrated. In the use case 600, a plurality of Apps of the computing device 102 may be arranged in a first sequence (not shown). For instance, the first sequence may include a clock, a music player, a health app, and a news app, in said order. Consider a case, where the user 114 is under stress due to, say, office work. Accordingly, a heart rate of the user 114 may increase. The one or more sensor(s) 210 may record the increase in heart rate and may store the reading in the sensor reading 602. Additionally, the user 114 may receive a tweet notification, and the same may be stored in the network data. Based on the sensor readings 602 and the network data, the context management module 204 may update the corresponding contextual scores of the health app and the twitter app. Accordingly, based on the updated contextual scores, the application management module 206 may reorder the first sequence by repositioning the health app and the twitter app after the clock, in said order. At a later time, when the heart rate is detected to be normal, the context management module 204 may further update the contextual score of the health app, and the application management module 206 may reposition the health app back to its original position.

Figure 7:
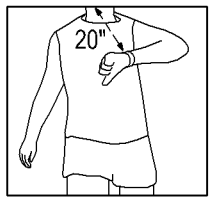
Figure 7:
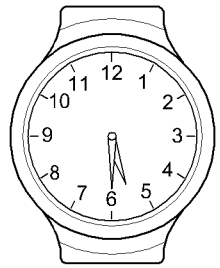
Figure 7:
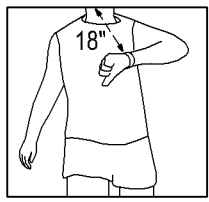
Figure 7:
Figure 7:
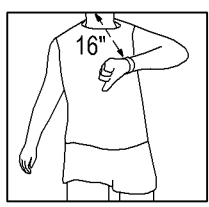
Figure 7:
Figure 7:
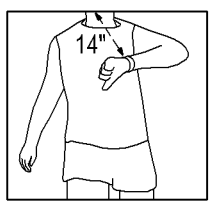
Figure 7:

Referring to FIG. 7, a use case 700 is illustrated. In the use case 700, a plurality of Apps of the computing device 102 may be arranged in a first sequence (not shown). For instance, the first sequence may include a clock, message inbox, a music player, a health app, and a news app, in said order. Consider a case when the user 114 is jogging. The one or more sensor(s) 210, in said use case 700, may record an increase in the pulse rate of the user and may record the increased pulse rate as sensor readings 702. Further, based on the network data, the context management module 204 may detect that no message has been received for the message inbox app and that not news has been received. Accordingly, the context management module 204 may update the corresponding contextual scores of the health app and the message inbox app and the news app. Based on the contextual scores, the application management module 206 may remove the message inbox app and the news app and may reposition the health app at the position of the message inbox app, and may add a pedometer app after the health app and before the music app.

Figure 8:
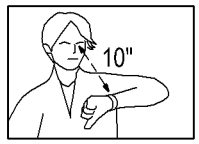
Figure 8:
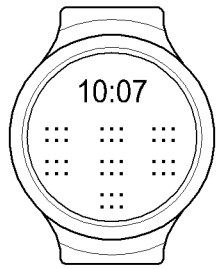
Figure 8:
Figure 8:
Figure 8:
Figure 8:
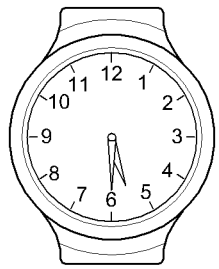
Figure 8:
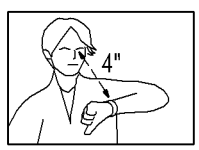
Figure 8:

Referring to FIG. 8, a use case 800 is illustrated. In the use case 800, a plurality of Apps of the computing device 102 may be arranged in a first sequence (not shown). For instance, the first sequence may include a clock, a music player, a health app, and a news app, in said order. Consider a case where the user 114 is at home and cooks a recipe in a smart device, i.e. a microwave oven, communicatively coupled to the computing device 102. During the preparation of the recipe, the user 114 goes to sleep. The sleep pattern is detected by the one or more sensor(s) 210, and accordingly, sensor readings 802 are recorded. Additionally, when the recipe is prepared, an alert from the microwave oven is received by the computing device 102 and stored in the network data. Based on the network data and the sensor readings 802, the context management module 204 may update the corresponding contextual scores of a sleep record app and an IoT device app. Based on the updated contextual scores, the application management module 206 may change the first sequence to include the sleep record app and the IoT device app, thereby obtaining a second sequence. On waking up, when the user 114 moves the computing device 102, the view generator 208 permits access to the IoT device app followed by the sleep record app, and then the remaining Apps of the second sequence.

Various exemplary embodiments may also be embodied as a storage medium including computer program code executable by a computer such as a program module executed by the computer. A computer readable medium may be any usable medium which may be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes any information transmission medium.

While specific language has been used to describe the present subject matter, any limitations arising on account thereto, are not intended. As would be apparent to a person in the art, various working modifications may be made to the method in order to implement the exemplary embodiments described herein. The drawings and the forgoing description give examples of exemplary embodiments. Those skilled in the art will appreciate that one or more of the described elements may well be combined into a single functional element. Alternatively, certain elements may be split into multiple functional elements. Elements from one exemplary embodiment may be added to another embodiment.

What is claimed is:

1. A method comprising:
    detecting a change in a context of a computing device;
    identifying a contextual score for each of a plurality of data items arranged in a first sequence;
    rearranging the plurality of data items into a second sequence different than the first sequence, based on the identified contextual score and flag information, wherein the flag information indicates whether the each of the plurality of data items is to remain in a fixed sequence position when the plurality of data items are rearranged from the first sequence to the second sequence;
    displaying a first data item from among the plurality of data items rearranged in the second sequence;
    detecting a distance between the computing device and a face of a user;
    in response to detecting that the distance changes in a first direction by at least a threshold amount while the first data item is displayed, ceasing the display of the first data item and displaying a second data item from among the plurality of data items rearranged in the second sequence; and
    in response to detecting that the distance changes in the first direction by at least the threshold amount while the second data item is displayed, ceasing the display of the second data item and displaying a third data item from among the plurality of data items rearranged in the second sequence.

2. The method as claimed in claim 1, wherein an order of the plurality of data items in the first sequence is based on at least one of:
    a name of each of the plurality of data items;
    a usage of each of the plurality of data items;
    an installation sequence of the plurality of data items;
    a pre-defined order of the plurality of data items; and
    a memory usage of each of the plurality of data items.

3. The method as claimed in claim 1, further comprising:
    detecting a movement of the computing device from a current position to a different position from the current position; and
    displaying a menu of the plurality of data items.

4. The method as claimed in claim 1, wherein the change in the context is based on at least one context based rule.

5. The method as claimed in claim 1, wherein the change in the context of the computing device comprises one or more of:
    a continuous change in a location of the computing device for a pre-defined time duration;
    at least one physiological parameter of the user being greater than a threshold value;
    receipt of a notification related to at least one data item from the plurality of data items; and
    receipt of a notification from another computing device communicatively coupled with the computing device.

6. The method as claimed in claim 1, wherein at least one data item from the plurality of data items is fixed at a predetermined position in the first sequence based on a user input, and the at least one data item that is fixed at the predetermined position in the first sequence is not rearranged when the first sequence is rearranged into the second sequence.

7. The method as claimed in claim 1, wherein the rearranging the plurality of data items into the second sequence comprises one or more of:
- repositioning at least one data item from the plurality of data items arranged in the first sequence;
- adding at least one data item to the plurality of data items;
- removing at least one data item from the plurality of data items; and
- fixing at least one data item from the plurality of data items at a predetermined position in the second sequence.

8. The method as claimed in claim 1, wherein the displaying the second data item further comprises displaying the second data item among the plurality of data items based on a first change with respect to the computing device.

9. The method as claimed in claim 8, wherein the first change comprises one or more of:
- a change in an orientation of the computing device from a first orientation to a second orientation;
- a change in the orientation of the computing device from the second orientation to the first orientation; and
- a movement of the computing device from a first position to a second position.

10. The method as claimed in claim 1, wherein the plurality of data items comprises at least one of an application, a folder, a webpage, or a multimedia file.

11. A computing device comprising:
- a display;
- a memory configured to store computer program code; and
- at least one processor configured to access the memory and operate according to the computer program code, the computer program code, when executed by the at least one processor, cause the at least one processor to:
  - detect a change in a context of the computing device,
  - identify a contextual score for each of a plurality of data items arranged in a first sequence,
  - rearrange the plurality of data items into a second sequence different than the first sequence, based on the identified contextual score and a flag information, wherein the flag information indicates whether the each of the plurality of data items is to remain in a fixed sequence position when the plurality of data items are rearranged from the first sequence to the second sequence,
  - control the display to display a first data item from among the plurality of data items rearranged in the second sequence,
  - detect a distance between the computing device and a face of a user,
  - in response to detecting that the distance changes in a first direction by at least a threshold amount while the first data item is displayed, cease the display of the first data item and control the display to display a second data item from among the plurality of data items rearranged in the second sequence, and
  - in response to detecting that the distance changes in the first direction by at least the threshold amount while the second data item is displayed, control the display to cease the display of the second data item and control the display to display a third data item from among the plurality of data items rearranged in the second sequence.

12. The computing device as claimed in claim 11, wherein an order of the plurality of data items in the first sequence is based on at least one of:
- a name of each of the plurality of data items;
- a usage of each of the plurality of data items;
- an installation sequence of the plurality of data items;
- a pre-defined order of the plurality of data items; and
- a memory usage of each of the plurality of data items.

13. The computing device as claimed in claim 11, wherein the computer program code, when executed by the at least one processor, further cause the at least one processor configured to:
- detect a movement of the computing device from a current position to a second position, and
- display a menu of the plurality of data items.

14. The computing device as claimed in claim 11, wherein the computing device further comprises:
- one or more sensors coupled to the at least one processor to record at least one of location data, physiological data, and network data, and
- wherein the computer program code, when executed by the at least one processor, cause the at least one processor to detect the change in the context of the computing device based on an analysis of at least one of the location data, the physiological data, and the network data.

15. The computing device as claimed in claim 11, wherein the change in the context is based on at least one context based rule.

16. The computing device as claimed in claim 15, wherein the change in the context of the computing device comprises one or more of:
- a continuous change in a location of the computing device for a pre-defined time duration;
- at least one physiological parameter of the user being greater than a threshold value;
- receipt of a notification related to at least one data item from the plurality of data items; and
- receipt of a notification from another computing device communicatively coupled to the computing device.

17. The computing device as claimed in claim 11, wherein the computer program code, when executed by the at least one processor, cause the at least one processor to fix at least one data item from the plurality of data items a predetermined position in the first sequence based on a user input, and the at least one data item that is fixed at the predetermined position in the first sequence is not rearranged when the first sequence is rearranged into the second sequence.

18. The computing device as claimed in claim 11, wherein to rearrange the plurality of data items into the second sequence, the computer program code, when executed by the at least one processor, cause the at least one processor to perform one or more of:
- repositioning at least one data item from the plurality of data items arranged in the first sequence;
- adding at least one data item to the plurality of data items;
- removing at least one data item from the plurality of data items; and
- fixing at least one data item at a predetermined position in the second sequence.

19. The computing device as claimed in claim 11, wherein the computer program code, when executed by the at least one processor, further cause the at least one processor to display the second data item from the plurality of data items based on a first change with respect to the computing device.

20. The computing device as claimed in claim 19, wherein the first change comprises one or more of:
- a change in an orientation of the computing device from a first orientation to a second orientation;
- a change in the orientation of the computing device from the second orientation to the first orientation; and a movement of the computing device from a first position to a second position.

21. The computing device as claimed in claim 11, wherein the plurality of data items comprises at least one of an application, a folder, a webpage, or a multimedia file.

\* \* \* \* \*